US011220221B2

(12) United States Patent
Keller et al.

(10) Patent No.: US 11,220,221 B2
(45) Date of Patent: Jan. 11, 2022

(54) CONSOLE FOR VEHICLE INTERIOR

(71) Applicant: GRAMMER AG, Amberg (DE)

(72) Inventors: Hubert Keller, Kuemmersbruck (DE);
Manfred Schlierf, Amberg (DE)

(73) Assignee: GRAMMER AG, Ursensollen (DE)

( * ) Notice: Subject to any disclaimer, the term of this patent is extended or adjusted under 35 U.S.C. 154(b) by 128 days.

(21) Appl. No.: 16/327,815

(22) PCT Filed: Aug. 29, 2017

(86) PCT No.: PCT/DE2017/000274
§ 371 (c)(1),
(2) Date: Jul. 22, 2019

(87) PCT Pub. No.: WO2018/050136
PCT Pub. Date: Mar. 22, 2018

(65) Prior Publication Data
US 2020/0254935 A1 Aug. 13, 2020

(51) Int. Cl.
*B60R 7/04* (2006.01)
*B60N 2/75* (2018.01)
(52) U.S. Cl.
CPC .............. *B60R 7/04* (2013.01); *B60N 2/77* (2018.02); *B60N 2/793* (2018.02)
(58) Field of Classification Search
CPC ... B60R 7/04; B60R 2011/0007; B60R 11/00; B60R 13/0262; B60R 11/0241; B60R 11/0252; B60R 16/023; B60N 2/793; B60N 3/101; B60N 2/773; B60N 3/102; B60N 3/00; B60N 2/75; B60N 2/753; B60N 2/757; B60N 3/10

USPC .... 296/24.34, 37.8, 70, 1.08, 1.09, 24.3, 64, 296/37.12, 37.1, 24.31; 29/428, 453, 430, 29/434, 464, 527.7, 825, 898.03
See application file for complete search history.

(56) References Cited

U.S. PATENT DOCUMENTS

| | | | |
|---|---|---|---|
| 5,749,629 A * | 5/1998 | Heath | B60N 2/753 297/411.36 |
| 6,003,927 A | 12/1999 | Koerber et al. | |
| 6,135,529 A * | 10/2000 | De Angelis | B60R 7/04 296/37.8 |
| 6,726,267 B2 * | 4/2004 | Kim | B60R 7/04 296/24.34 |

(Continued)

FOREIGN PATENT DOCUMENTS

| | | |
|---|---|---|
| DE | 20118300 U | 3/2002 |
| DE | 202007008537 U | 9/2007 |
| EP | 1468844 A | 10/2004 |

*Primary Examiner* — D Glenn Dayoan
*Assistant Examiner* — Sunsurraye Westbrook
(74) *Attorney, Agent, or Firm* — Andrew Wilford

(57) ABSTRACT

The invention relates to a console for a vehicle passenger compartment. The console comprises for example an armrest and a fixed storage compartment that is under the armrest. The object of the invention is to provide a console comprising a storage compartment that offers a high degree of flexibility with respect to the possible uses in the vehicle and with respect to the space requirement.
The particularity is that the console of a vehicle has a frame and a container, wherein the container is mounted so as to be movable relative to the frame, and wherein the container can be completely separated from the frame.

7 Claims, 4 Drawing Sheets

(56) References Cited

U.S. PATENT DOCUMENTS

| | | | |
|---|---|---|---|
| 6,921,118 B2* | 7/2005 | Clark | B60N 3/102 |
| | | | 296/24.34 |
| 7,416,235 B2* | 8/2008 | Rajappa | B60R 7/04 |
| | | | 296/24.34 |
| 8,196,985 B2* | 6/2012 | Penner | B60R 7/04 |
| | | | 296/24.34 |
| 8,919,847 B2* | 12/2014 | Mather | B60N 2/753 |
| | | | 296/24.34 |
| 10,011,240 B1* | 7/2018 | Ranganathan | B60N 2/0232 |
| 2003/0234560 A1 | 12/2003 | Gaillard | |
| 2007/0194582 A1 | 8/2007 | Arbaugh | |
| 2007/0296234 A1 | 12/2007 | Sturt et al. | |
| 2010/0078954 A1 | 4/2010 | Liu | |
| 2010/0090491 A1 | 4/2010 | Hipshier et al. | |
| 2011/0068598 A1 | 4/2011 | Penner | |

* cited by examiner

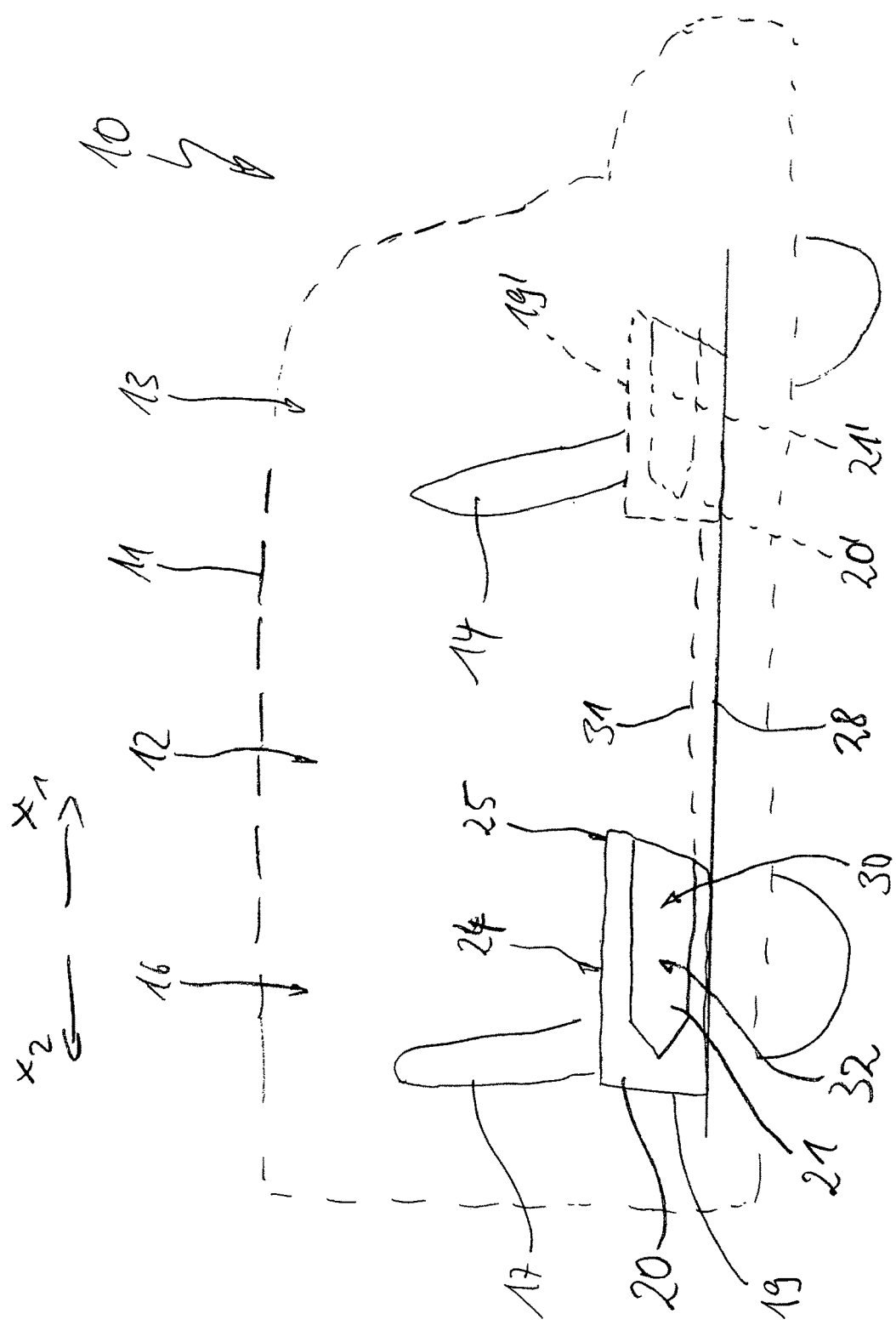

CONSOLE FOR VEHICLE INTERIOR

CROSS REFERENCE TO RELATED APPLICATIONS

This application is the US-national stage of PCT application PCT/DE2017/000274 filed 29 Aug. 2017 and claiming the priority of German patent application 102016010468.6 itself filed 31 Aug. 2016.

FIELD OF THE INVENTION

The invention relates to a console for a vehicle passenger compartment.

BACKGROUND OF THIS INVENTION

A console of this kind is known from public prior use. The console comprises for example an armrest and a fixed storage compartment that is located under the armrest.

OBJECT OF THE INVENTION

The object of the invention is to provide a console comprising a storage compartment and that offers a high degree of flexibility with respect to the possible uses in the vehicle and with respect to the space requirement.

SUMMARY OF THE INVENTION

The console has a frame and a container forming at least one storage compartment. The storage compartment may be designed for example as a cup holder, storage pocket or cool box.

The container is movable relative to the frame. For example, the container can be completely separated from the frame.

According to one embodiment, the frame is fixed, and the container is movable between a primary position and a secondary position. This may be advantageous for example when the frame has user interfaces (HMI). For example, according to one embodiment, a frame is fixed only in the front of the vehicle. According to an alternative embodiment, a frame is for example fixed only in the back of the vehicle. For example, according to a further alternative embodiment, a first front frame is fixed in the front of the vehicle, and a second frame is fixed in the back, but only one container is provided that is movable into a position nested in the first frame and into a position nested in the second frame.

If, for example, it is intended for the occupant in the back of the vehicle to be able to access the container, the container can be moved back by the guide, while the frame remains in the front of the vehicle.

According to an alternative embodiment, the container and the frame can be moved separately from one another or together between the primary and the secondary position.

The frame and the container may be nested inside one another for example. The container can for example be moved relative to the frame, between a nested position in which the container is in a nested manner with respect to the frame, and a separated position in which the container is completely separated from the frame. The frame forms a tunnel for example, into which the container is moved in the nested position. In the nested position, the frame and the container can for example be moved together between the primary and the secondary position.

The frame may form an armrest, for example. This region may be height-adjustable, for example. An adjuster, for example, is provided for this purpose. The adjuster can for example adjust the entire frame relative to a floor of the vehicle passenger compartment. According to an alternative embodiment, for example just a first part of the frame, which contains the armrest, is adjustable relative to a second part of the frame.

The frame has, for example, at least one recess, through which the container can be accessed, in the nested position, from the at least one seat that is located beside the frame. This may for example be in the form of openings on opposing flanks of the frame. In this case, lateral access to the container is possible. The frame may for example be C-shaped, and comprise lateral recesses. In this embodiment it is possible, for example, for a storage compartment to be provided, in addition to the container, under an armrest of the frame.

According to an alternative, or in addition, for example the armrest of the frame has an opening that can be closed by a cover that is movable between an open position and a closed position. In the nested position, for example, the armrest is so as to be over the container at least in part. In the open position the container can be accessed through the opening, and in the closed position the opening is closed.

In order to move the container, for example at least one guide carries the container for movement along a path between a primary position and a secondary position. For example, the container can be arranged beside at least one seat, by the guide. For example, the container may be arranged between two seats that are in a front of the vehicle, and/or between two seats that are in a back of the vehicle. In the primary position, the container is for example between the seats of the front. In the secondary position, the container is for example between the seats of the back.

The guide forms, for example, a guide for the container and a guide for the frame. That is to say that the container or the frame can be moved separately, or the container and the frame can be moved together, e.g. in a nested position, between the primary and the secondary position, by the guide.

The guide is for example formed by a guide rail or by a guide groove, on which a guide element that is fixedly connected to the frame or to the container, is guided.

BRIEF DESCRIPTION OF THE DRAWING

Furthermore, the container and/or the frame may contain for example operating elements, air-conditioning elements, sound elements and network ports.

Further advantages can be found in the description of embodiments shown in the figures. In the figures:

FIG. 4 is a side view of the vehicle passenger compartment according to a second embodiment.

SPECIFIC DESCRIPTION OF THE INVENTION

Figure 1:
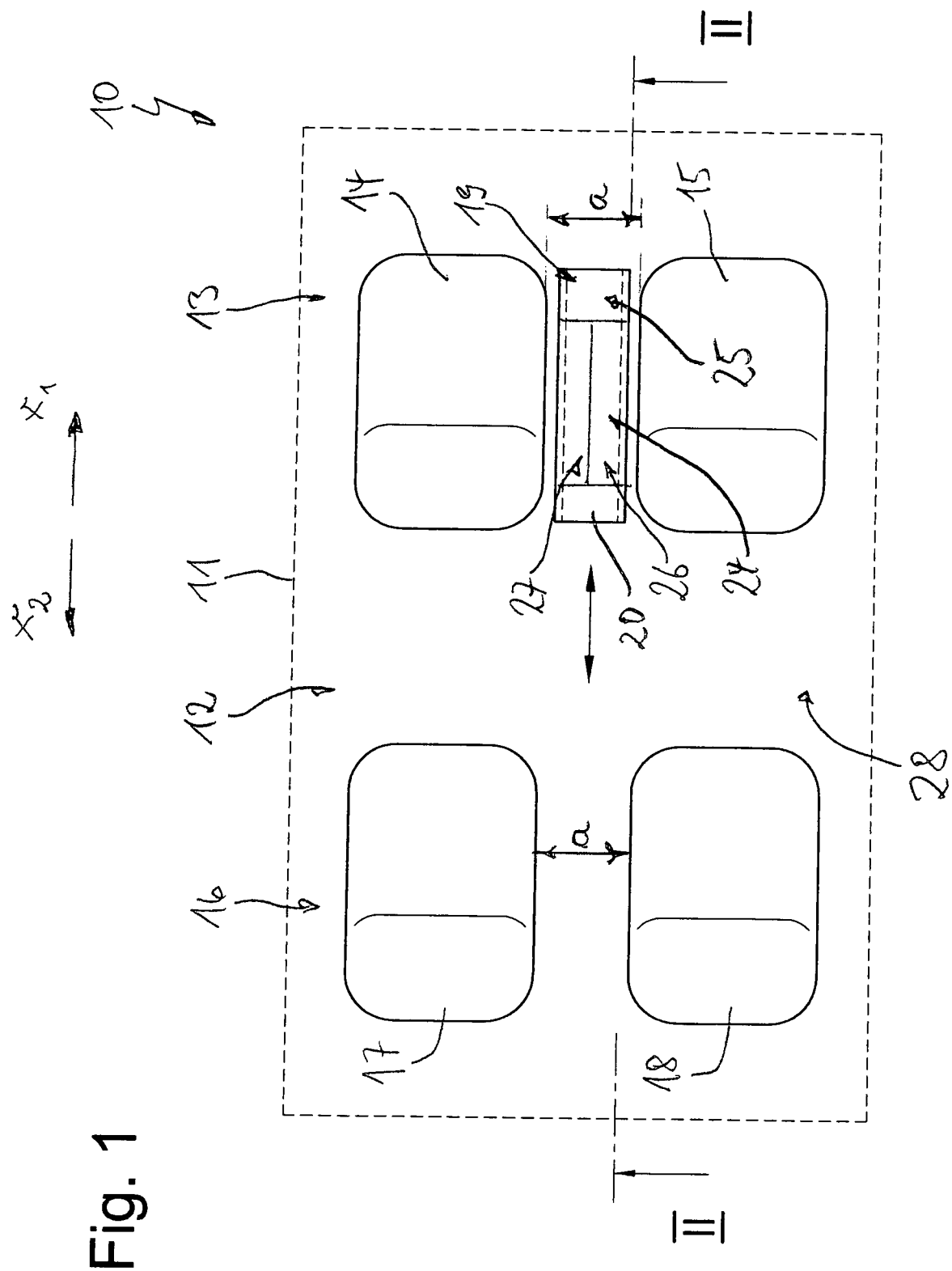
FIG. 1 is a plan view of a vehicle passenger compartment according to a first embodiment.

The same reference characters in the different figures denote corresponding parts, even if prime symbols follow or are omitted.

FIG. 1 is a schematic plan view of a vehicle 10 in which a vehicle wall 11 is indicated by a dashed line. During forward travel, the vehicle moves in a direction $x_1$. In a passenger compartment 12 of the vehicle 10, seats 14 and 15 are shown in a front 13, and seats 17 and 18 are shown in a back 16.

The seats 14 and 15 and the seats 17 and 18 are at a mutual spacing a. The spacing a is dimensioned such that a console 19 can be provided therebetween. The console 19 has a frame 20 and a container 21. In this embodiment, the frame 20 is approximately C-shaped (see FIG. 2).

The frame 20 has an upper part 22 and a lower part 23. The frame 20 has recesses 32 on both sides. The upper part 22 forms an armrest 24 and is provided with an operating part 25. Furthermore, a storage compartment 26 formed in the upper part 22 (see FIG. 1) can be opened and closed by a cover 27. In the closed position, the cover 27 forms part of the armrest 24.

The frame 20 comprising the armrest 24 may be shifted, for example by an adjuster, in the directions $x_1$ and $x_2$. According to an alternative embodiment, it is also possible, for example, for only the upper part 22 comprising the armrest 24 to be shiftable by an adjuster in the directions $x_1$ and $x_2$. In this case, the upper part 22 is moved relative to the lower part 23.

In the present embodiment, the lower part 23 forms two approximately parallel feet 29 fastened to a floor 28 of the passenger compartment 12. Only one foot 29 of the feet 29 can be seen in FIG. 2. The lower part 23 and the upper part 22 form a tunnel 30. The lower part 23 is fixed to the floor 28.

The container 21 is movable by an adjuster in the directions $x_1$ and $x_2$ between a primary position and a secondary position. The primary position of the container is shown in FIG. 2, and the secondary position is shown in FIG. 3.

The adjuster has a guide 31 for movement of the container 21 on the floor 28 in the directions $x_1$ and $x_2$. The guide 31 is indicated in FIG. 2 by a dashed line oriented parallel to the floor 28. In this manner, it is possible to move the container 21 into the tunnel 30 such that according to FIG. 2 the container 21 and the frame 20 are nested together. In this nested position, the container 21 can be accessed through the recesses 32. When the container 21 and frame 20 are nested, the container 21 does not require any additional space.

The adjuster has for example an electrical drive (not shown) for movement between the primary position and the secondary position. The drive can be controlled for example on a control panel 25 or by an additional control panel (not shown) located within reach of the seats 17 and 18.

Figure 2:
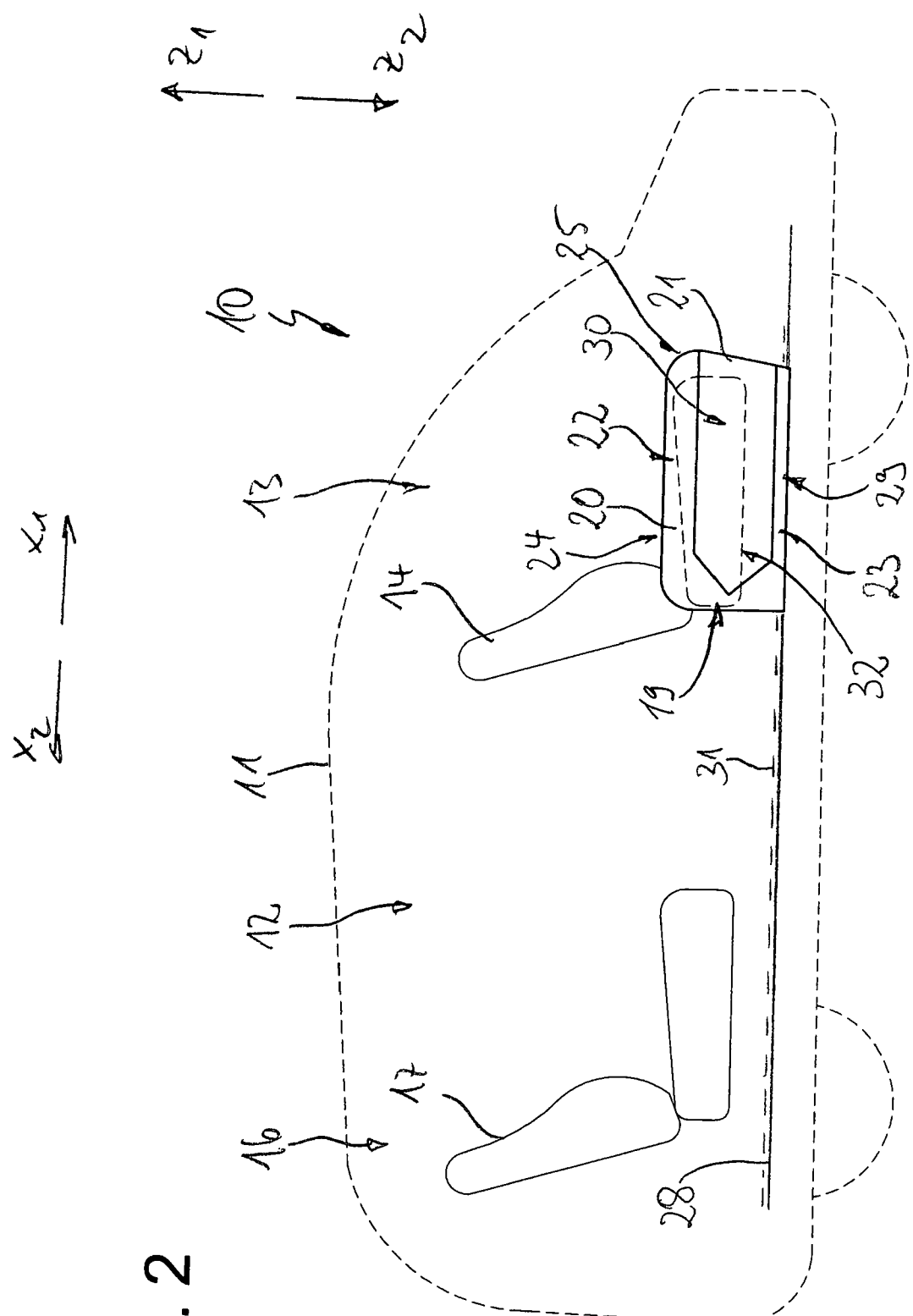
FIG. 2 is a section according to the section line II-II of FIG. 1 where a container of a console is in a forward position.
Figure 3:
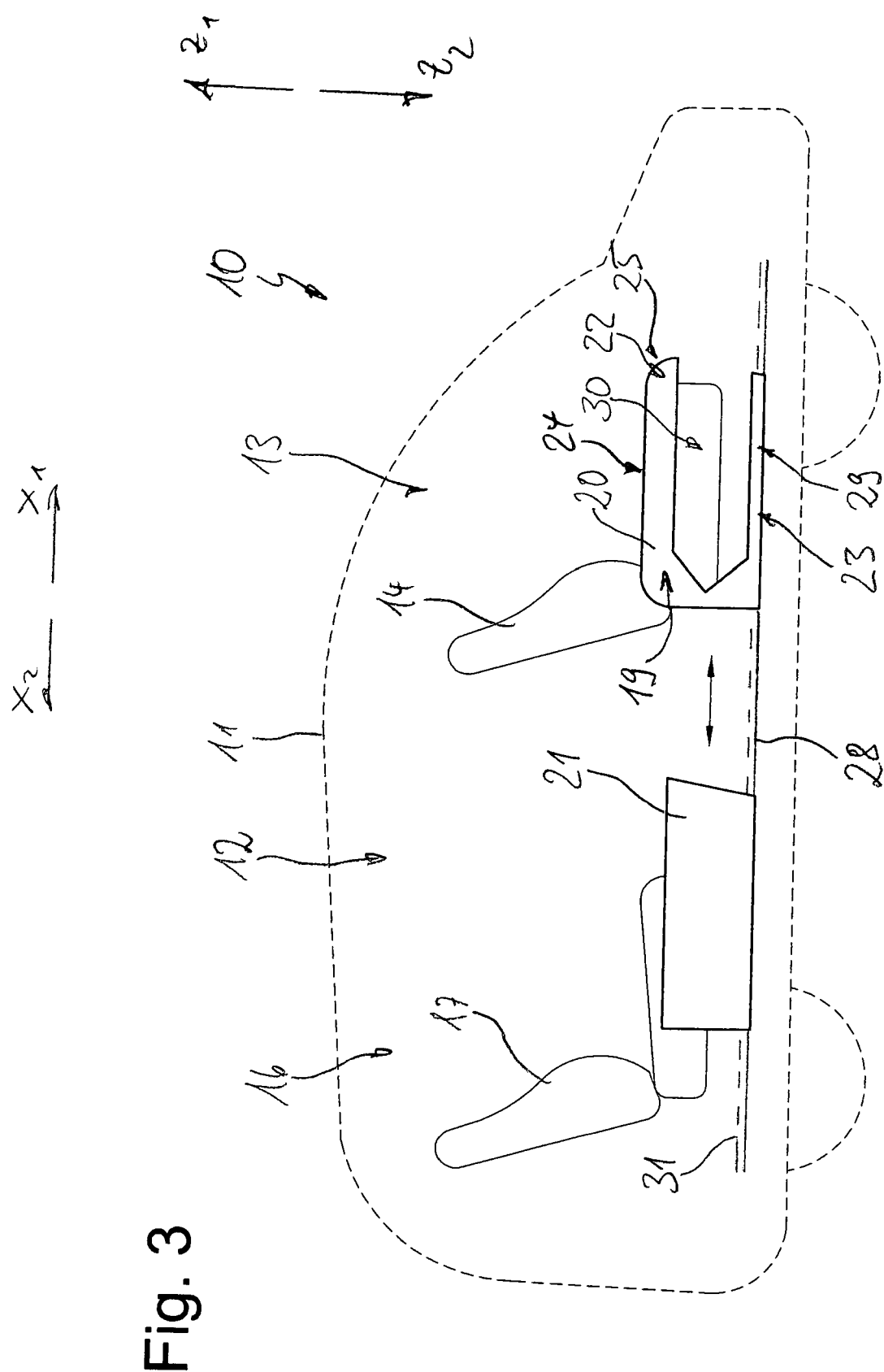
FIG. 3 is a section like FIG. 2 where the container is in a rear position.

In FIG. 2, the container 21 is in the primary position. If occupants of the seats 17 and 18 wish to access the container 21, this container can be moved out of the position according to FIG. 2 in the direction $x_2$, for example between the seats 17 and 18 and into the secondary position shown in FIG. 3, or for example between the front 13 and the back 16.

In the present embodiment, the frame 20 is fixed only between the seats 14 and 15. However, according to an alternative unillustrated embodiment, a frame 20 comprising a tunnel 30 may in addition also be provided between the seats 17 and 18. If the container is moved between the seats 17 and 18, in the alternative embodiment this container can also be moved into the tunnel 30 of the frame 20 between the seats 17 and 18.

In the present embodiment, a latch is provided on the container 21 that can lock the container relative to the guide 31 in each position. According to an alternative embodiment, the container 21 can for example be locked relative to the guide 31 only in specific positions, for example in the primary position shown in FIG. 2 and in the secondary position shown in FIG. 3. For example, according to an alternative, or in addition, it may be possible for the container to be releasably locked to the frame 20.

A second embodiment is shown in FIG. 4. This embodiment differs from the first embodiment simply in that not only the container 21, but also the frame 20, is movable in the directions $x_1$ and $x_2$. For example, the frame 20 is carried by the guide 31 so as to be movable in the directions $x_1$ and $x_2$.

In this case, both the frame 20 and the container 21 can be moved separately from one another or, for example in the nested position, also together between a primary position between the seats 14 and 15 and a secondary position between the seats 17 and 18, and into intermediate positions.

In FIG. 4, the frame 20 and the container 21 (see the solid line) are in a secondary position between the seats 17 and 18. From this position, the frame and the container can be moved together into the primary position in which the console, the frame, and the container are drawn in dashed lines in FIG. 4 and denoted by 19', 20' and 21', respectively. Furthermore, it would also be possible to move the frame 21 or the container 21 separately from one another into the primary position or the secondary position.

The invention claimed is:

1. A console of a vehicle, the console comprising:
   a frame formed with a recess, movable between a primary position and a secondary position, and having an upper side forming an armrest;
   a groove or rail in the vehicle defining a guide path extending from the frame;
   means for height adjustment of the armrest; and
   a container mounted so as to be movable relative to the frame independently of or together with the frame between the primary and secondary positions and along the guide path between a position nested in the frame and a position spaced along the guide path and separated from the frame, the container being accessible through the recess in the nested position.

2. The console according to claim 1, wherein the container is completely separated from the frame in the separated position.

3. The console according to either claim 1, wherein, in the primary position, the armrest is above the container at least in part.

4. The console according to claim 1, wherein the armrest is formed with an opening closable by a cover.

5. The console according to claim 1, wherein the frame forms a tunnel in which the container can fit in the nested position.

6. The console according to claim 1, further comprising:
   a pair of front seats in the vehicle spacedly transversely flanking the primary position; and
   a pair of rear seats in the vehicle spacedly transversely flanking the secondary position.

7. The console according to claim 6, wherein there are two of the recesses on the frame each opening transversely toward a respective one of the front seats.

* * * * *